(12) United States Patent
Ramachandra et al.

(10) Patent No.: US 12,321,738 B2
(45) Date of Patent: Jun. 3, 2025

(54) INCREMENTAL IMAGE IMPORT PROCESS FOR SUPPORTING MULTIPLE UPSTREAM IMAGE REPOSITORIES

(71) Applicant: Bank of America Corporation, Charlotte, NC (US)

(72) Inventors: Madhukiran Bangalore Ramachandra, San Ramon, CA (US); Brian Jacobson, Los Angeles, CA (US); Donna Phillips, Elkton, MD (US); Vismay Mandloi, Kendal Park, NJ (US); Elvis Nyamwange, Little Elm, TX (US)

(73) Assignee: Bank of America Corporation, Charlotte, NC (US)

( * ) Notice: Subject to any disclaimer, the term of this patent is extended or adjusted under 35 U.S.C. 154(b) by 259 days.

(21) Appl. No.: 17/892,754

(22) Filed: Aug. 22, 2022

(65) Prior Publication Data

US 2024/0061667 A1  Feb. 22, 2024

(51) Int. Cl.
*G06F 8/61* (2018.01)
*G06F 8/71* (2018.01)

(52) U.S. Cl.
CPC . *G06F 8/63* (2013.01); *G06F 8/71* (2013.01)

(58) Field of Classification Search
CPC .......... G06F 8/63; G06F 8/71; G06F 9/45558
See application file for complete search history.

(56) References Cited

U.S. PATENT DOCUMENTS

| | | | |
|---|---|---|---|
| 9,928,862 B1 | 3/2018 | Park et al. | |
| 10,002,247 B2 | 6/2018 | Suarez et al. | |
| 10,261,782 B2 | 4/2019 | Suarez et al. | |
| 10,725,775 B2 | 7/2020 | Suarez et al. | |
| 11,029,975 B2* | 6/2021 | Prasad | G06F 9/44526 |
| 11,573,816 B1* | 2/2023 | Featonby | H04L 67/10 |
| 12,026,493 B2* | 7/2024 | Jang | G06F 8/63 |
| 12,204,886 B2* | 1/2025 | Mohan | G06F 8/65 |
| 2017/0147319 A1* | 5/2017 | Riek | H04L 67/06 |
| 2017/0255462 A1 | 9/2017 | Azagury et al. | |
| 2018/0088926 A1* | 3/2018 | Abrams | H04L 67/568 |
| 2018/0173524 A1 | 6/2018 | Azagury et al. | |
| 2019/0050680 A1* | 2/2019 | Waugh | G06F 18/23 |
| 2021/0255846 A1* | 8/2021 | Mamgain | H04L 67/34 |

* cited by examiner

*Primary Examiner* — Marina Lee
(74) *Attorney, Agent, or Firm* — Banner & Witcoff, Ltd.

(57) ABSTRACT

Aspects of the disclosure are directed to importing software container images, where an image importer that may import a very large number of container images into local repositories from one or more upstream repositories to an enterprise container platform. An associated computing cluster executes containers (for example, applications and operators) based on the imported container images. Each release (version) of a product supported by the enterprise container platform may require importing newer image sets with respect to the current version. With one aspect, an image importer maintains an image list for container images of the current version, where only missing newer container images for a newer version are added to the list. Only the missing container images for the new version are imported to the enterprise container platform. This approach circumvents importing previously imported container and/or available newer images, thus reducing the amount of imported data from upstream repositories.

18 Claims, 10 Drawing Sheets

INCREMENTAL IMAGE IMPORT PROCESS FOR SUPPORTING MULTIPLE UPSTREAM IMAGE REPOSITORIES

BACKGROUND

A container image is typically an unchangeable, static file that includes executable code so it can run an isolated process on information technology (IT) infrastructure. The image may include system libraries, system tools, and other platforms settings a software program needed to run on a containerization platform. The image may share the OS kernel of its host machine.

A container image is typically compiled from file system layers built onto a parent or base image. These layers encourage reuse of various components, so the user does not create everything from scratch for every project. Technically, a base image is used for a wholly new image, while a parent indicates modification of an existing image.

Many software vendors create publicly available images of their products. For example, Microsoft offers a SQL Server 2017 container image that runs on Docker. However, container adopters should be aware of the existence of corrupt, fake and malicious publicly available container images, sometimes disguised to resemble official vendors' images.

Container images are often stored in a registry (repository) that is either private or public on a repository, such as Docker Hub. The image creator pushes it to the registry, and a user pulls the image when they want to run it as a container. Features such as Docker Content Trust rely on digital signatures to help verify that images files downloaded from public repositories are original and unaltered. However, this added verification of authenticity does not prevent the creation or distribution of malware.

Some images are purposefully minimal, while others have large file sizes.

Images are typically identified through the first 12 characters of a true identifier and have a virtual size measured in terms of distinct underlying layers. Images may be tagged or left untagged and only searchable through a true identifier.

To be widely interoperable, container images often rely on open standards and operate across different infrastructures including virtual and physical machines and cloud-hosted instances. In container deployments, applications are isolated from one another and abstracted from the underlying infrastructure.

However, enterprise IT organizations should monitor for fraudulent images, and train users about best practices when they pull from public repositories. To avoid the issue, an organization may create a limited list of available images.

SUMMARY

Aspects of the disclosure are directed to importing software container images. Aspects are directed to an image importer that may import a very large number of container images into local repositories from one or more upstream repositories to an enterprise container platform, where an associated computing cluster executes applications based on the imported container images. Each release (version) of a product supported by the enterprise container platform requires importing newer image sets with respect to the current version. Importing numerous large container images from multiple upstream repositories may be an expensive operation.

With one aspect of the embodiments, an image importer maintains an image list for container images of the current version, where only missing newer container images for a new version are added to the list. Only the missing container images for the new version are imported to the enterprise container platform. This approach circumvents importing previously imported container and/or available newer images, thus reducing the amount of imported data from upstream repositories.

With another aspect, a container image importer for maintains a first list of current container images for a current version of a software product and determines a second list of newer container images for a subsequent version of the software product with respect to the current version. When a newer container image is missing, the image importer adds the newer container to a third list of newer container images and repeats the adding for all of the newer container images in the second list. Consequently, the container image importer imports, via a communication interface, the container images from the at least one upstream repository only for the newer container image on the third list. Consequently, the newer container images are imported only once spanning all versions of the software product.

With another aspect, when the current version of the software product is the initial version of the software product, the content image importer imports all of the container images in the first list of current container images and subsequently incrementally imports newer content images for subsequent versions.

With another aspect, a container image importer obtains a manifest file, in which a first set of container images and a second set of container images are partitioned into an active category and an archived category, respectively. The container image importer includes the first set of container images into the third list, where the first set of container images are imported from the at least one upstream repository.

With another aspect, the container image importer moves an entry for the newer container image in a manifest file from the active category to the archived category when the newer container image has been stored in a local repository.

With another aspect, a container image importer supports an image pruner image that is configured to receive a catalog index image and a list of requested container images and to add only a subset of newer container images in the active category of a first manifest file, where the subset of newer container images is included in both the catalog index image and the list of requested images. The subset may comprise a first container image, where the image pruner engine is configured to modify a second manifest file when the second manifest file includes the first container image under the active category.

With another aspect, a container image importer comprises a job trigger engine. The job trigger engine is configured to initiate importing the newer container image when a manifest file is available. For example, the manifest file may be created or may be modified to include requested container images from a user.

With another aspect, an image puller engine is configured to initiate copying of the newer container image to a temporary memory. The image puller engine is configured to initiate scanning of the newer container image in the temporary memory, where the scanning verifies an integrity of the newer container image. The image puller engine is configured to initiate moving the newer container image from the temporary memory to the local repository only when the scanning verifies the integrity of the newer container image.

With another aspect, a container image importer comprises a container platform that may support OpenShift, Docker, or Kubernetes technologies.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which.

DETAILED DESCRIPTION

In the following description of various illustrative embodiments, reference is made to the accompanying drawings, which form a part hereof, and in which is shown, by way of illustration, various embodiments in which aspects of the disclosure may be practiced. In some instances, other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

As will be further discussed, aspects of the embodiments may offer benefits that are not supported by traditional approaches. For example, in accordance with an aspect of the embodiments, software container images are incrementally imported from one or more upstream repositories. Traditional approaches often import all available container images whether or not a subset of available container images have been previously imported. For example, there may be thousands of container images (perhaps some having several gigabytes of data) available from vendors, where infrastructure support needs only a small subset of the available images to update the infrastructure. Perfunctorily importing all of the available container images may overwhelm the system, thus degrading system performance during the time of updating. Incrementally importing container images, however, reduces the data bandwidth that is needed to import container images from the one or more upstream repositories, often via the Internet. Moreover, after the container images have been imported, the imported container images are typically scanned by an image scanner to verify the integrity of the imported container images. By incrementally importing container images, repeating the verification of previously imported container images is circumvented. In addition, an imported container image may be nefariously modified after the container image has been imported. By incrementally importing container images, the possibility of importing nefariously modified container images is reduced.

As a brief introduction to the concepts described further herein, one or more aspects of the disclosure relate to supporting a container image importer on a computer platform utilizing one of a plurality container technologies including, but not limited to, Docker, Kubernetes, and OpenShift.

Docker is container technology and a company-offered container image runtime. It is supported by its ecosystem to manage and run Docker container images with its dependencies as performed by the Docker Enterprise Engine (Docker EE).

Kubernetes is an open source container orchestration solution. While the Docker EE is limited, Kubernetes provides the ability to run containers on various machines, auto-scale containers, distribute load between containers, manage storage required by containers, provide resiliency of containers in case of failure and more. Features offered by Kubernetes may be complementary to Docker.

OpenShift supports a platform for providing services mainly powered by Kubernetes and includes Docker to manage workloads.

A container is a standard unit of software that packages up code and all its dependencies so the application runs quickly and reliably from one computing environment to another.

A container image is a binary software structure that typically includes all of the requirements for running a single container, as well as metadata describing its needs and capabilities. Container images become containers at runtime and, in the case of Docker containers, where images become containers when they run on the Docker EE. Available for both Linux and Windows-based applications, containerized software typically runs the same, regardless of the infrastructure. Containers isolate software from its environment and ensure that it works uniformly despite differences for instance between development and staging.

A registry contains a collection of one or more image repositories, which contain one or more tagged images.

A container technology may enable a developer to create their own containers. In addition, container images may be obtained from third party vendors from corresponding upstream repositories based on an online container catalog. Categories may include, but not limited to, container management, mobile application development, operating systems, programming languages, logging and monitoring, and database management.

Containers may support applications and/or operators (which may be referred to as plug-ins).

Operators are typically pieces of software that facilitate the operational complexity of running another piece of software, for example, acting as an extension of the container environment. Operators may be designed to handle upgrades seamlessly and react to failures automatically such as skipping a software backup process to save time.

With an aspect of the disclosure, when multiple operators (plug-ins) require the same container images, the same container images are imported only once rather than multiple times. This approach enhances the efficiency of the importing process.

With another aspect of the disclosure, when a previous version of the platform had a subset of container images previously imported, importing the subset for a subsequent version is circumvented, thus saving computing resources. In such a situation, importing of container images is supported in an incremental manner.

These and other features are described in further detail below.

Figure 1:
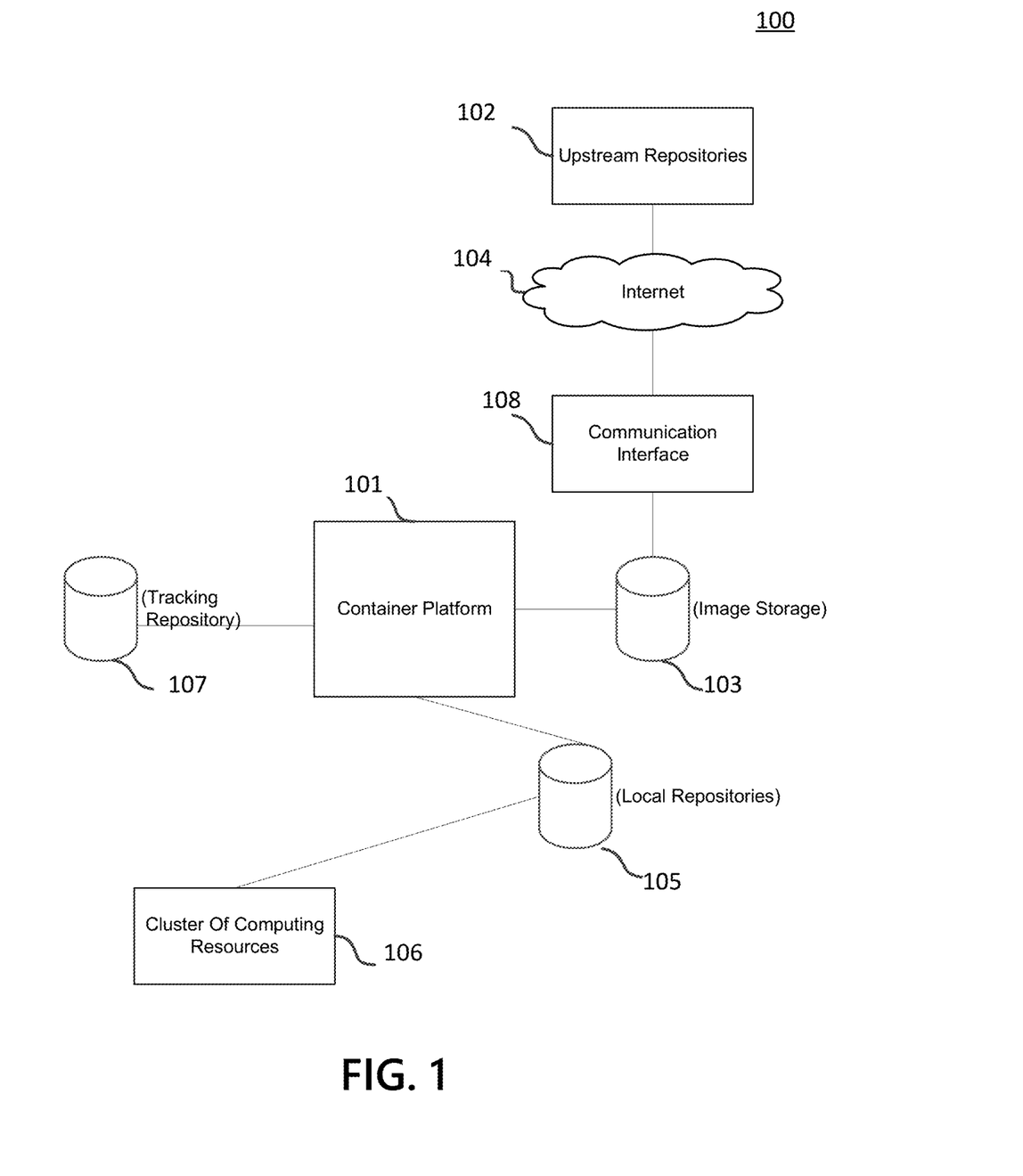
FIG. 1 depicts an illustrative computing environment for supporting importing container images in accordance with one or more example embodiments.

FIG. 1 depicts an illustrative computing environment 100 for supporting importing container images in accordance with one or more example embodiments.

A container image importer comprises container platform 101, image storage 103, local repositories 105, computing cluster 106, tracking repository 107, and communication interface 108. The container image importer imports one or more container images from upstream repositories 102 via Internet 104 through communication interface 108. As will be discussed in further detail, the container image importer processes the imported container images and then moves the imported container images to local repositories 105. Users may execute containers based on the imported container images by executing the containers on computing cluster 106, which may comprise a set of computing nodes that may be physical computers or virtual machines.

Figure 5:
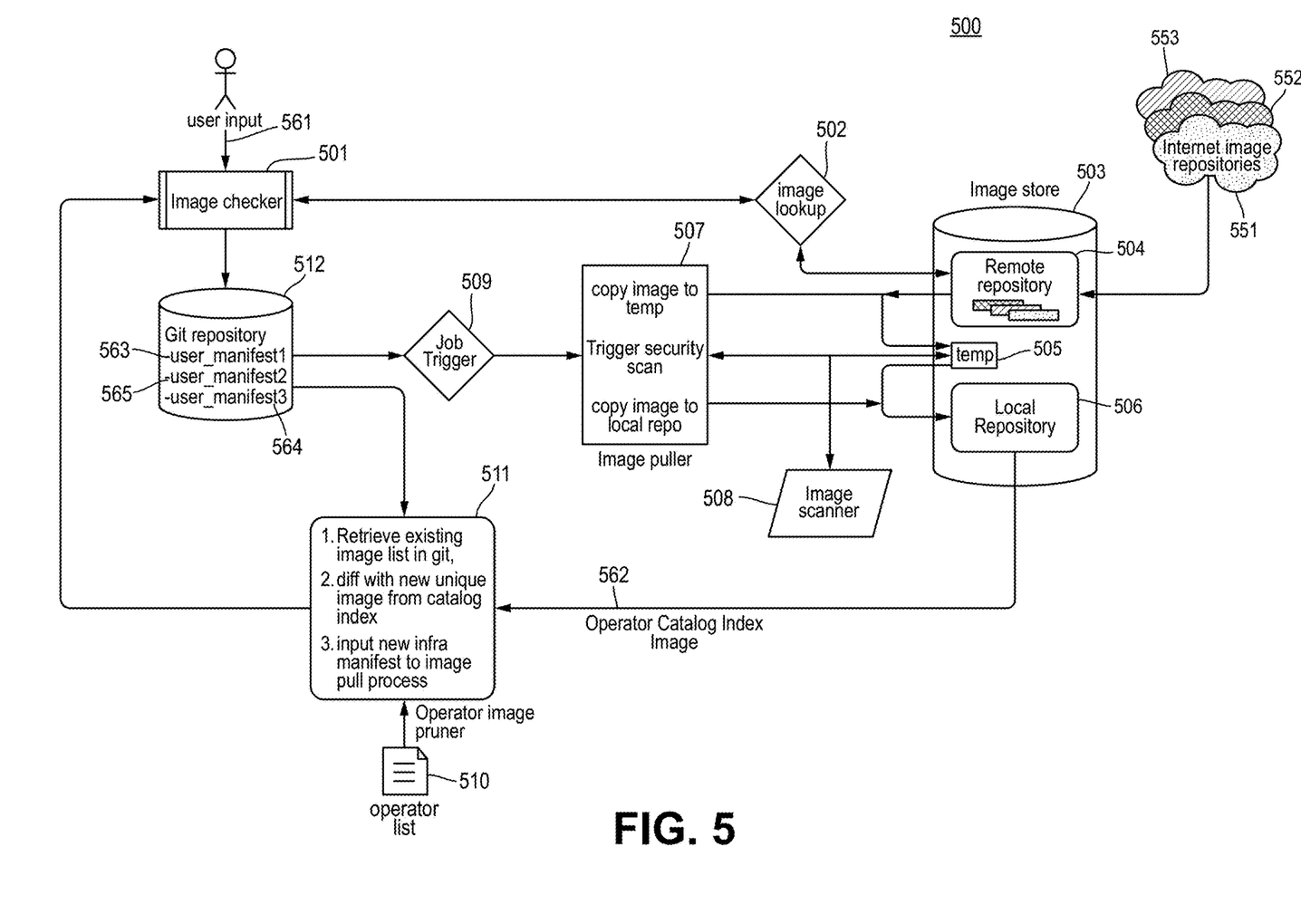
FIG. 5 depicts an exemplary computer system for supporting importing container images in accordance with one or more example embodiments.

Container platform 101 may support software engines (for example, image checker engine 501, image lookup engine 502, image puller engine 507, job trigger 509, and image pruner engine 511 as shown in FIG. 5) for processing imported container images.

Imported container images are pulled from upstream repositories 102 and temporarily stored in image storage 103 while the container images are being validated. When successfully validated, the container images are moved into local repositories 105 and executed by computing cluster 106.

The container image importer imports container images from upstream repositories 102 and stores the imported container images into local repositories in accordance with manifest files that are stored in tracking repository 107. A manifest file (for example, manifest files 563-565 as shown in FIG. 5) is typically associated with an entity such as a user or infrastructure support. The manifest file contains source information about the designated upstream repositories and destination information about the designated local repositories.

Figure 2:
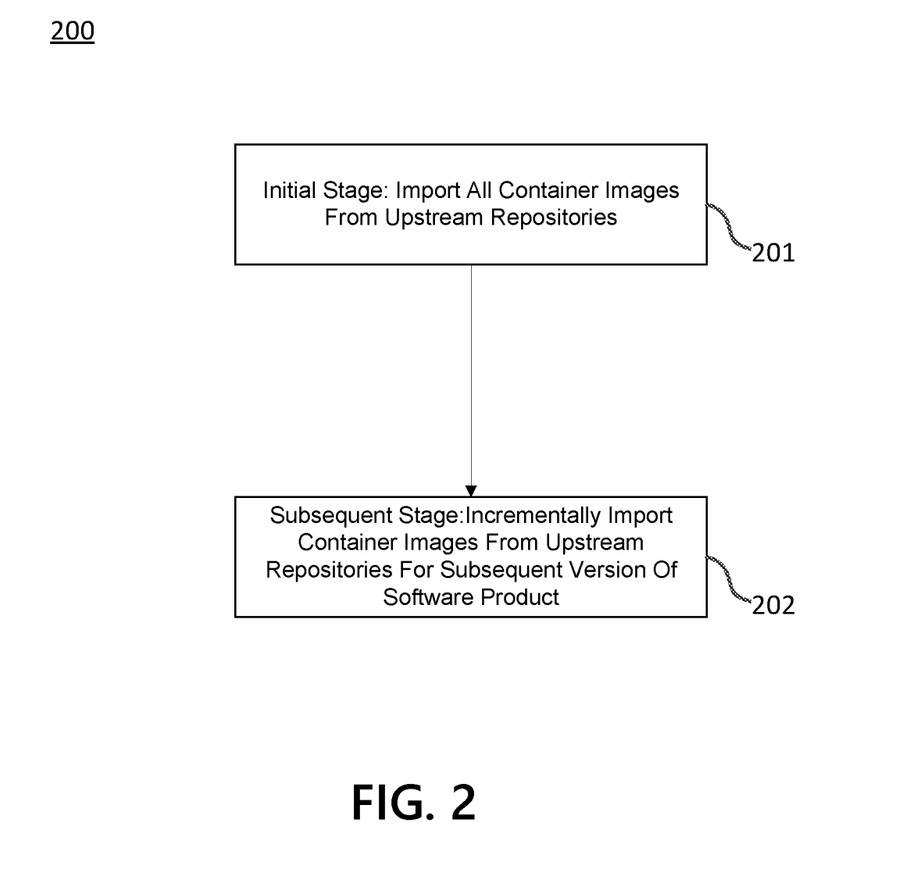
FIG. 2 depicts a flowchart that the computer system shown in FIG. 1 may execute to import container images in accordance with one or more example embodiments.

FIG. 2 depicts flowchart 200 that the container image importer shown in FIG. 1 may execute to import container images in accordance with one or more example embodiments.

At the initial stage, as shown at block 201, the current version of the software product is the initial version of the software product. The container image importer imports all of the container images since no container images have been previously imported from upstream repositories 102. However, when subsequently importing container images at bock 202, the container image importer incrementally imports container images, where previously imported container images are imported.

Figure 3:
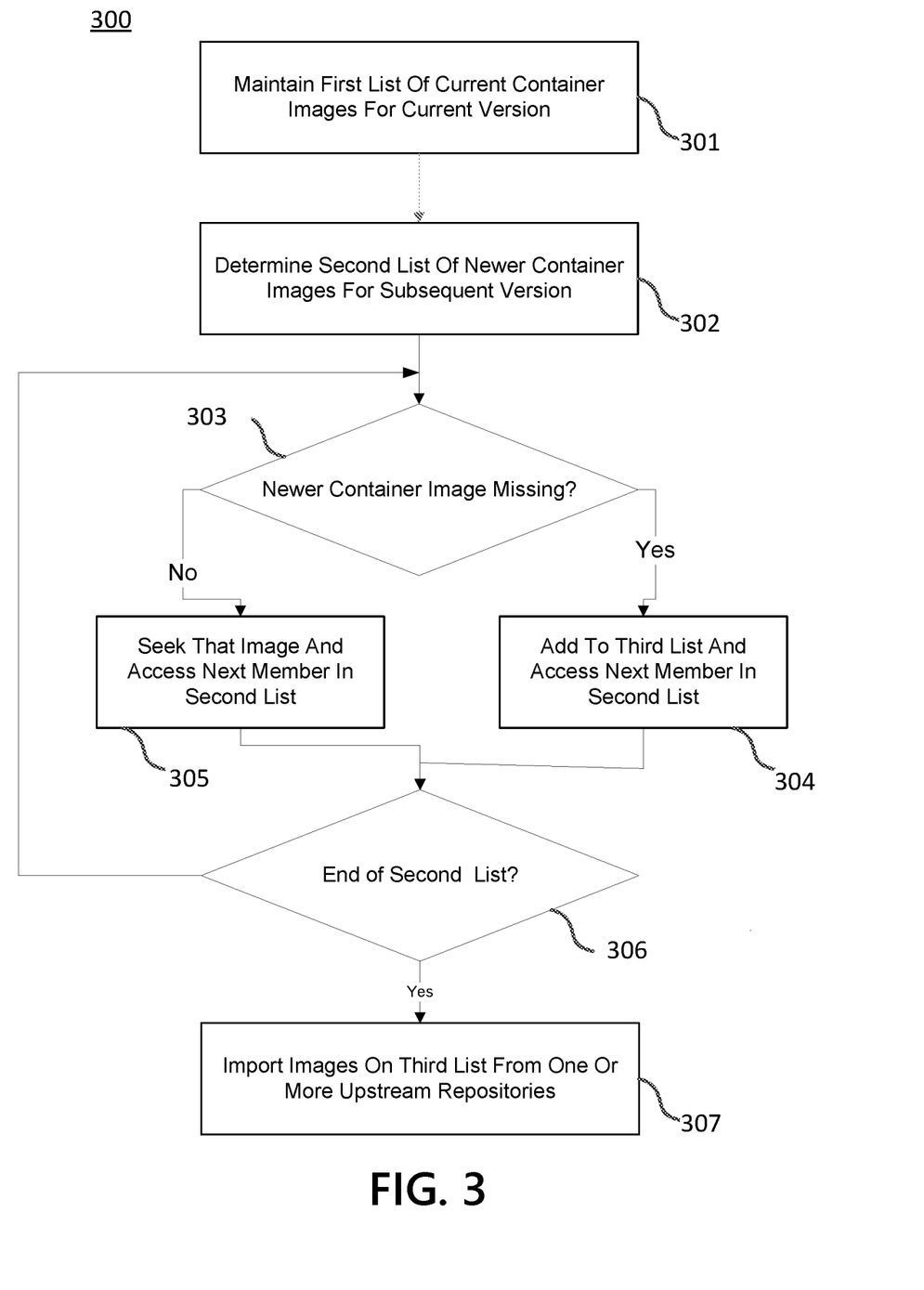
FIG. 3 depicts a flowchart that the computer system shown in FIG. 1 may execute to import container images in accordance with one or more example embodiments.

FIG. 3 depicts flowchart 300 that the container image importer shown in FIG. 1 may execute to import container images in accordance with one or more example embodiments.

At block 301, the container image importer maintains a first list of current container images for a current version of a software product. At block 302, the container image importer determines a second list of newer container images for a subsequent version of the software product with respect to the current version.

A newer container image may be an additional container image or may be a newer version of the container image.

At block 303, the container image importer determines whether any of the newer container images are missing (for example, when the newer contacting image is not stored in local repository 105 or in image storage 103). The container image importer accesses an entry in the second list. When a newer container image is missing, the container image importer adds the newer container image to a third list of newer container images and accesses the next entry in the second list at block 304. However, if the newer container image is not missing, the container image importer seeks the newer container image and accesses the next entry in the second list at block 305. The container image importer repeats the above blocks until the end of the second list at block 306.

At block 307, the container image importer the container images lists in the third list from upstream repositories 102. Consequently, the newer container images are imported only once spanning all versions of the software product.

Figure 4:
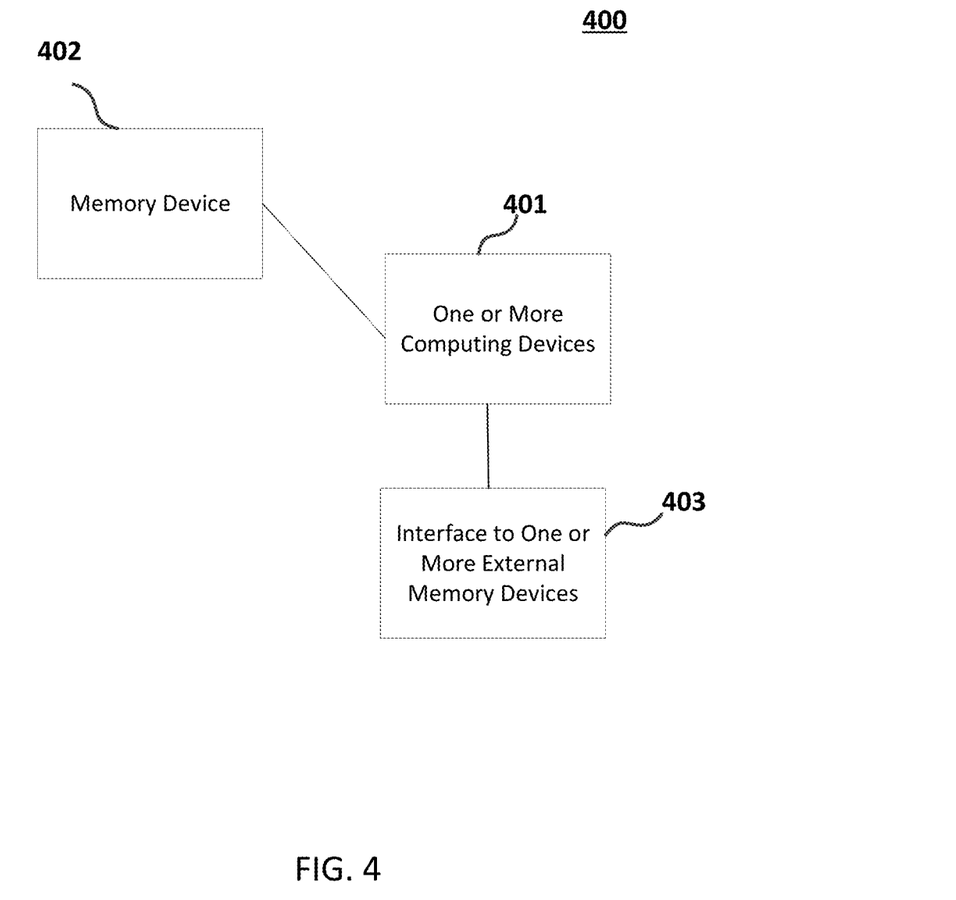
FIG. 4 depicts an apparatus for supporting a container platform 300 in accordance with one or more example embodiments.

FIG. 4 depicts apparatus 400 for supporting a container platform 101 as shown in FIG. 1. Apparatus 400 may include computing device 401, which supports software engines for executing processes (for example, processes 200 and 300 as shown in FIGS. 2 and 3, respectively) discussed herein.

Computing device 401 may obtain computer-readable instructions from memory device 402, which supports a computer-readable media. Computer-readable media may be any available media that may be accessed by computing device 401 and may include both volatile and nonvolatile media, removable and non-removable media. By way of example, and not limitation, computer-readable media may comprise a combination of computer storage media and communication media.

Computer storage media may include volatile and non-volatile, removable and non-removable media implemented in any method or technology for storage of information such as computer readable instructions, data structures, program modules or other data. Computer storage media include, but is not limited to, random access memory (RAM), read only memory (ROM), electronically erasable programmable read only memory (EEPROM), flash memory or other memory technology, CD-ROM, digital versatile disks (DVD) or other optical disk storage, magnetic cassettes, magnetic tape, magnetic disk storage or other magnetic storage devices, or any other medium that can be used to store the desired information and that can be accessed by the computing device.

Communication media typically embodies computer-readable instructions, data structures, program modules or other data in a modulated data signal such as a carrier wave or other transport mechanism and includes any information delivery media. Modulated data signal is a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media.

Apparatus 400 also includes interface 403 that interfaces to one or more storage devices such as image storage 103, local repositories 105, and tracking repository 107.

FIG. 5 depicts exemplary computer system 500 for supporting importing a container image importer in accordance with one or more example embodiments. Operation of the container image importer may be analyzed in two stages: Stage 1 (without operator image pruner 511) and Stage 2 (with operator image pruner 511).

During Stage 1, image checker 501 receives user input 561 that is indicative of requested container images from the user. Image lookup 502, in conjunction with remote repository 504, verifies whether requested container images are valid and available from an upstream repository 551-553 and whether the user is permitted (for example, based on the user's job function) to obtain the requested container images. Any of the invalid requested containers are prevented from being imported for the user at a later step.

Figure 6:
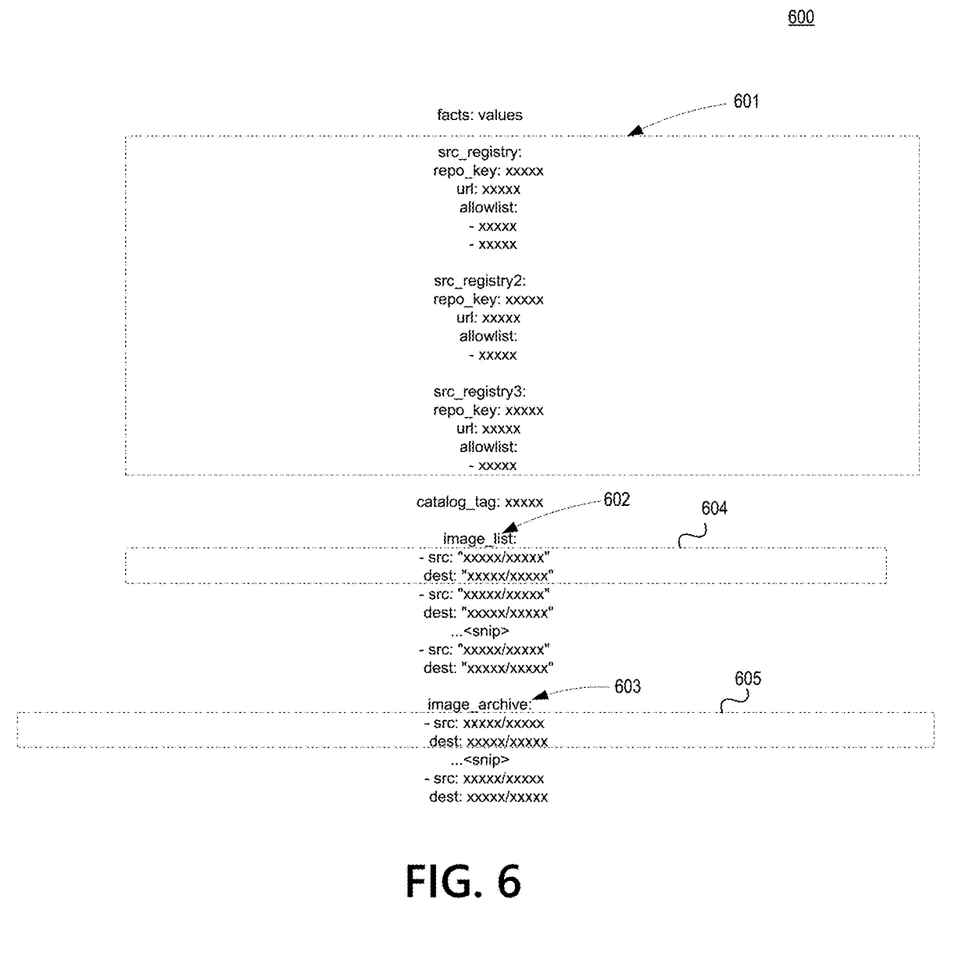
FIG. 6 depicts an exemplary manifest file in accordance with one or more example embodiments.

User manifest file 563 is created/updated to include all valid requested container images, where newer container images are listed under image_list category 602 and previously imported container images (stored in local repository 506) are included under archived_image category 603 (as shown in FIG. 6). Entry 604 shows an exemplary entry for a newer container image and entry 605 shows an exemplary entry for an archived container image. Any invalid requested container images are not entered into user manifest file 563.

When user manifest file 563 is provided to tracking repository 512 (for example, a GIT repository) job trigger process 509 initiates a job to import all image containers listed under image_list category 602 of user manifest file 563. This causes image puller 507 to pull those container images from associated upstream repositories 551-553 through remote repository 504 and copy one or more of the imported container images into temp memory 505. Image puller 507 then triggers a security scan, where image scanner 508 scans the one or more imported container images to verify the integrity of the scanned images (for example, verify that no malware is detected). When the integrity of the one or more imported container images are verified, the one or more imported container images are moved into local repository 506. The above steps are subsequently repeated for the remaining imported container images. Once the container images are moved into local repository 506, the corresponding entries in user manifest file 563 are moved to archived_image category 603. At that time the user has access to the requested container files.

With one aspect of the embodiments, if a requested container image has a corresponding entry under archived_image category 603, the requested container image is already stored in local repository 506; consequently, the requested container image is not imported.

Container image imported may also support operation during Stage 2 with the inclusion of image pruner 111.

Operator image pruner 511 receives operator catalog image index image 562, which is a directory of container images that are provided by local repository 506. Typically, the directory includes many (perhaps thousands) container images that are available from upstream repositories 551-553. The operator of the container platform infrastructure selects a subset of the available images via operator list 510. This approach may greatly reduce the number of imported container images, where only the subset is included under image_list category 602 of infra manifest file 564.

Moreover, image pruner 511 may obtain user manifest file 563 and infra manifest file 564 from tracking repository 512 and modify manifest files 563 and 564 accordingly. For example, if infra manifest file 564 and user manifest file 563 were to contain the same container image under image_list category 602, the corresponding entry in user manifest file 563 would be moved under archived_image category 603.

Tracking repository 512 is provided the updated or created manifest files via image checker process 501.

Job trigger 509 initiates a new job when one or more of manifest files are created or modified and presented to tracking repository 512. Image puller 507 then imports corresponding container images as discussed in Stage 1.

FIG. 6 depicts exemplary manifest file 600 in accordance with one or more example embodiments. As will be described, manifest file 600 contains metadata for a group of container images associated with an entity such as a user or an infrastructure support of the container platform environment.

As will be discussed in further detail, one or more manifest files may be created/maintained in a tracking repository (for example, tracking repository 107 and tracking repository 512 as shown in FIGS. 1 and 5, respectively). Each manifest file corresponds to different entities such as users and infrastructure support, for example, manifests 563-565 as shown in FIG. 5.

Section 601 includes information about source registries corresponding to upstream repositories from which container images may be imported. Container registries may support container-based application development or may connect directly to container orchestration platforms such as Docker and Kubernetes.

Manifest file 600 partitions listed container images into two categories: image_list category 602 (which may be referred to as the active category) and image_archive category 603 (which may be referred to as the archived category). The container images under image_list category 602 are the container images that will be imported from upstream repositories and the container images under image_archive category 603 have been previously imported and stored in local repositories.

The number of container images under image_list category 602 is typically substantially less than the number of container images under image_archive category 603 since most of the container images have been previously imported. Consequently, according to an aspect of the embodiments, an incremental image import process imports only newer container images listed under image_list category 602. Once a container image has been successfully imported, the member for the container image is moved from image_list category 602 to image_archive category 603.

Member 604 corresponds to a first container image under image_list category 602. Member 602 contains source information from which the first container image is imported and destination information where the imported first container image is stored in the local repositories.

Member 605 corresponds to a second container image under image_archive category 603. If the second container image is subsequently requested by a user or infrastructure support, the image importer detects that the second container image does not need to be imported again.

Each manifest file corresponds to different entities users and infrastructure support, for example, manifests 563-565 as shown in FIG. 5.

Referring to FIG. 5, manifest files 563 and 564 are associated with first and second users, respectively. When the two or more users request the same valid container image, the image importer may detect the same requests from manifest files 563 and 564, where the same container image is listed under image_list category 602. When the image importer detects this occurrence, it may import the container image only once rather than multiple times.

Figure 7A:
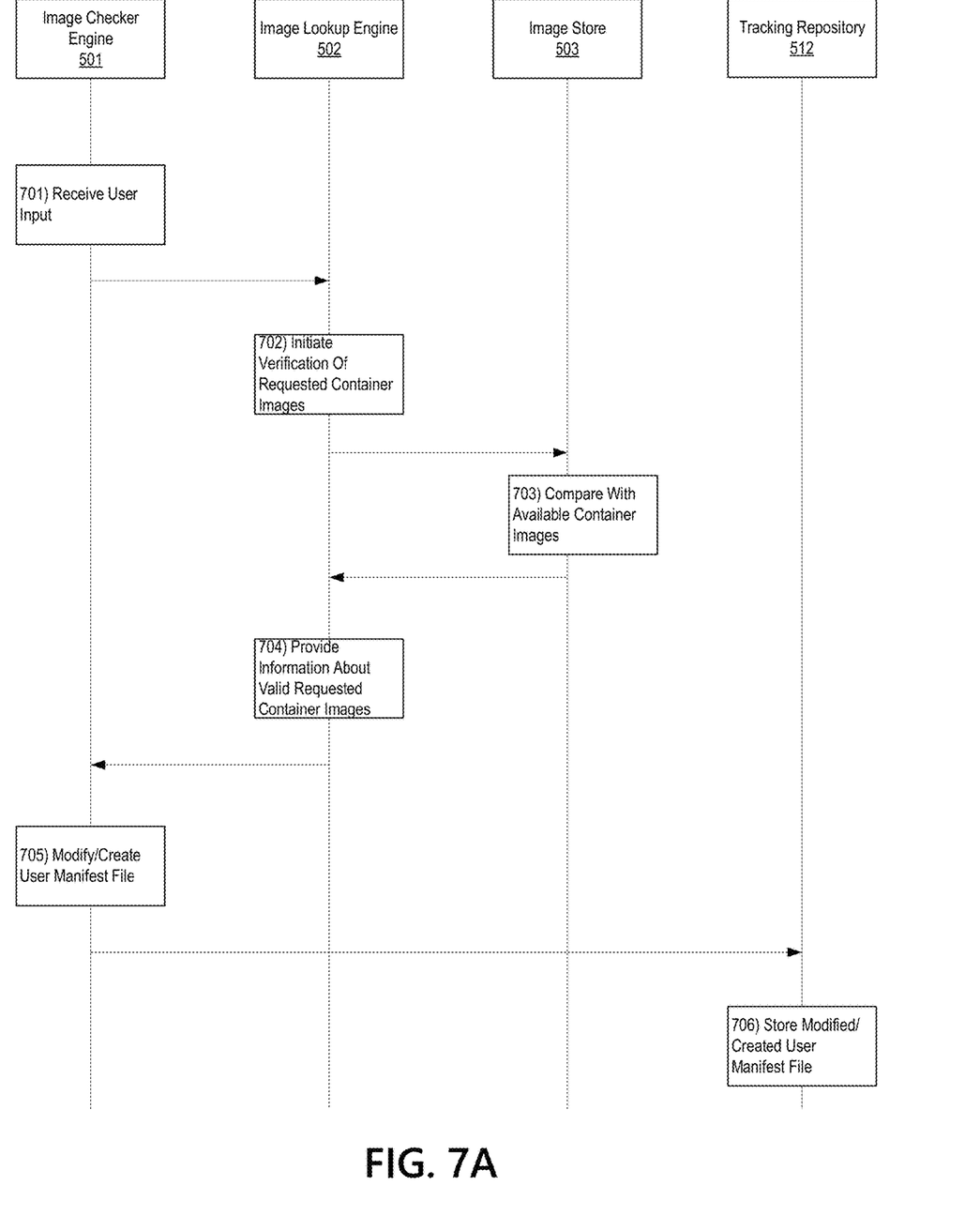
FIGS. 7A-C depict an illustrative event sequence for importing container images during Stage 1 in accordance with one or more example embodiments.
Figure 7B:
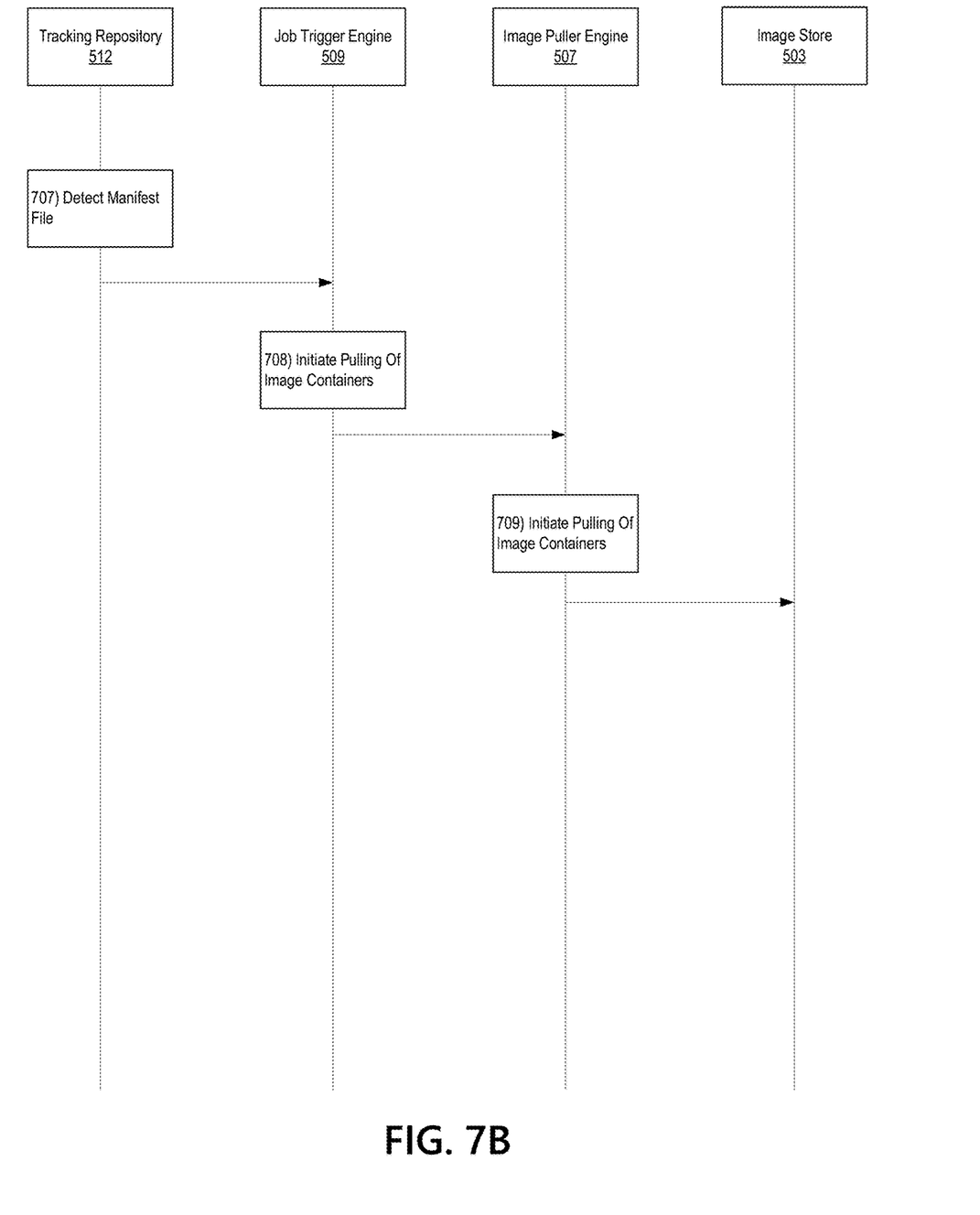
Figure 7C:
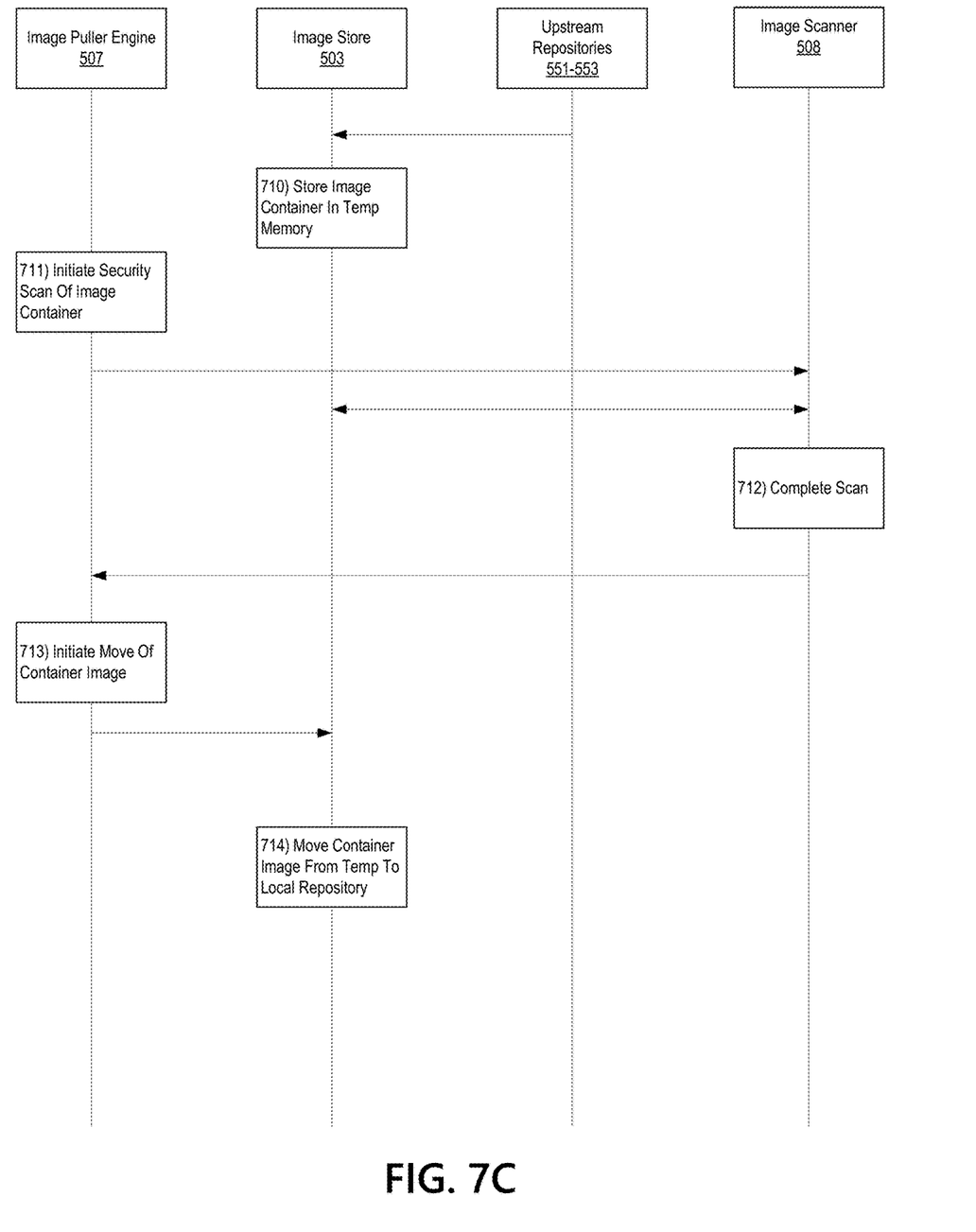

FIGS. 7A-C depict an illustrative event sequence for the container image importer shown in FIG. 5 during Stage 1.

Referring to FIG. 7A, at block 701 image checker engine 501 receives a user request that is indicative of one or more requested container images typically corresponding to applications that may execute on a computer infrastructure or on a mobile device. At block 702 image lookup engine 502 initiates the verification of the requested container images. For example, verification by image store 503 at block 703 may ascertain that the requested container images are available from upstream repositories. Image lookup engine 502 utilizes validation information from image store 503 to inform image checker 501 whether the requested container images are valid. Moreover, image checker 501 may determine whether the requested container images are consistent with the user's job function. For example, either through an automated process and/or manual gateway, if the requested container image involves important functions of the computer infrastructure and the user is not an administrator, image checker 501 may deny the user's request. If the request is deemed valid by image checker 501, image checker 501 may create or modify the manifest file associated with the user at block 705 and store it at tracking repository 512 at block 706.

Referring to FIG. 7B, when tracking repository 512 detects the manifest file, tracking repository 512 initiates a job through job trigger engine 509 in order to pull the newer container images from upstream repositories 561-563 by image puller engine 507 and to store them in image storage 503 at block 707-709.

Referring to FIG. 7C, the pulled container images are stored in temporary memory of image storage 503 at block 710. Image puller engine 507 then initiates a security scan of the stored container image by image scanner 508 at block 711. When the scan is completed at block 712 and if no security issues are detected, image puller engine 507 initiates the moving of the container image at block 713. The container image is subsequently moved from the temporary memory to the local repository at block 714.

Figure 8:
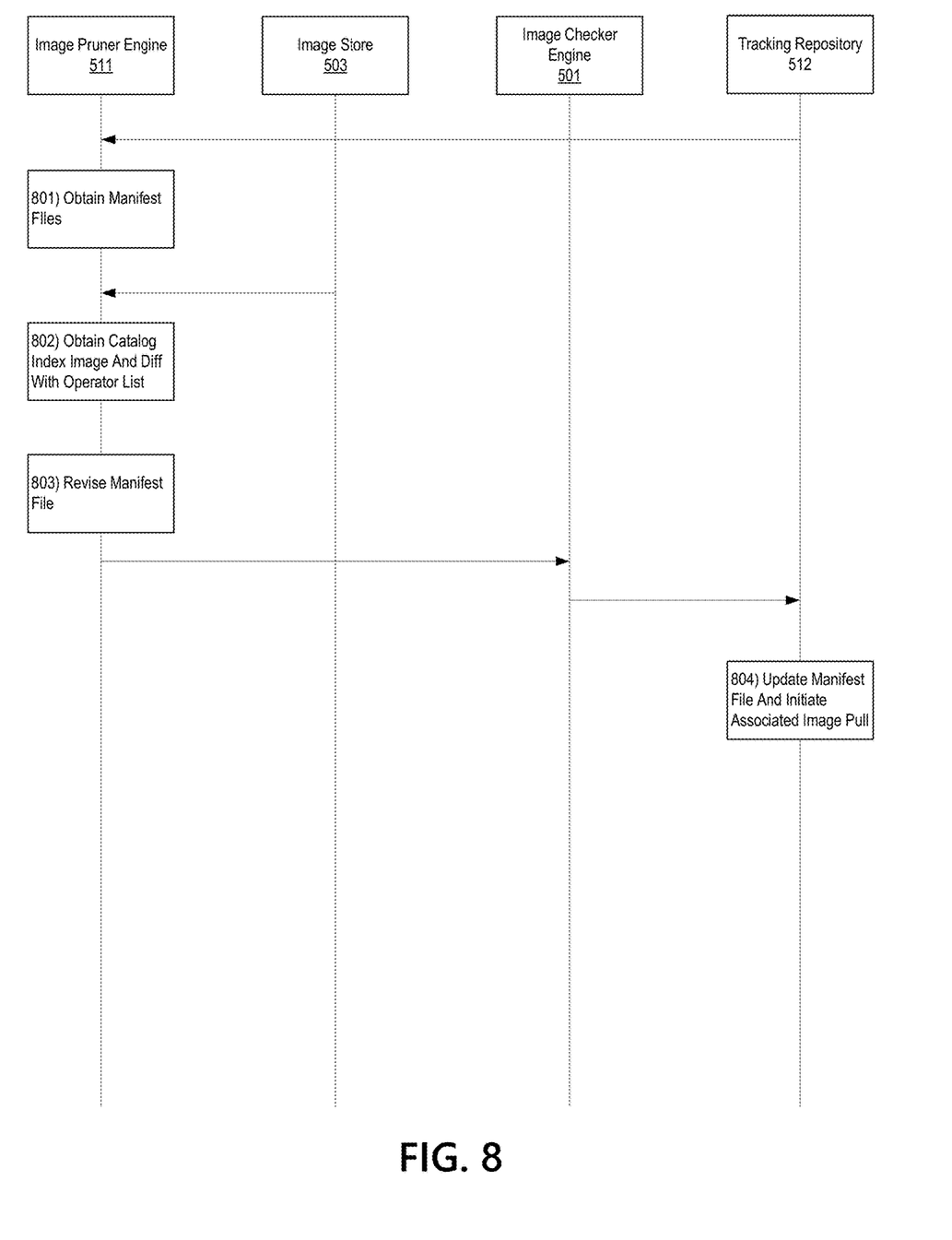
FIG. 8 depicts an illustrative event sequence for importing container images during Stage 2 in accordance with one or more example embodiments.

FIG. 8 depicts an illustrative event sequence for the container image importer shown in FIG. 5 during Stage 2. At block 801 image pruner engine 511 obtains one or more manifest files from tracking repository 512. Image pruner image 511 also obtains catalog image index image 562, which provides a directory of available images, for example, from vendors, and diffs the list of available container images with the operator list (shown as operator list 510 as shown in FIG. 5) at block 802.

The associated manifest file is then modified so that the newer container images to be imported are included under image list category 602 at block 803. The container images under category 602 are then imported as described above.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (for example, air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (for example, a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A container image importer for importing a plurality of container images from at least one upstream repository, the container image importer comprising:
   at least one processor;
   a communication interface communicatively coupled to the at least one processor; and a memory storing computer-readable instructions that, when executed by the at least one processor, cause the container image importer to:
- maintain a first list of current container images for a current version of a software product;
- determine a second list of newer container images for a subsequent version of the software product with respect to the current version;
- when a newer container image is missing from the second list, add the newer container image to a third list of newer container images;
- repeat the adding of all newer container images missing from the second list to the third list; and
- import, via the communication interface, container images from the at least one upstream repository only for the newer container images on the third list, wherein the newer container images are imported only once spanning all versions of the software product.

2. The container image importer of claim 1, wherein the memory storing computer-readable instructions that, when executed by the at least one processor, further cause the container image importer to:
- when the current version of the software product is an initial version of the software product, import all of the container images in the first list of current container images.

3. The container image importer of claim 1, wherein the memory storing computer-readable instructions that, when executed by the at least one processor, further cause the container image importer to:
- obtain a first manifest file, wherein a first set of container images and a second set of container images are partitioned into an active category and an archived category, respectively;
- include the first set of container images into the third list, wherein the first set of container images is imported from the at least one upstream repository; and
- obtain the second set of container images from a local repository.

4. The container image importer of claim 3, wherein the memory storing computer-readable instructions that, when executed by the at least one processor, further cause the container image importer to:
- when the newer container image has been stored in a local repository, move an entry for the newer container image in the first manifest file from the active category to the archived category.

5. The container image importer of claim 3, further comprising an image pruner engine, wherein the image pruner engine is configured to receive a catalog index image and a list of requested container images and to add only a subset of newer container images to the active category of the first manifest file and wherein the subset of newer container images is indicated by both the catalog index image and the list of requested images.

6. The container image importer of claim 5, wherein the subset comprises a first container image and wherein the image pruner engine is configured to modify a second manifest file when the second manifest file includes the first container image under the active category.

7. The container image importer of claim 5, further comprising a container platform, wherein the container platform supports the image pruner engine.

8. The container image importer of claim 3, further comprising a job trigger engine, wherein the job trigger engine is configured to initiate importing the container images when the first manifest file is available.

9. The container image importer of claim 8, further comprising an image puller engine, wherein the image puller engine is configured to initiate copying of the container images to a temporary memory.

10. The container image importer of claim 9, wherein the image puller engine is configured to initiate scanning of the container images in the temporary memory and wherein the scanning verifies an integrity of the container images.

11. The container image importer of claim 10, wherein the image puller engine is configured to initiate moving the container images from the temporary memory to a local repository only when the scanning verifies the integrity of the container images.

12. The container image importer of claim 1, wherein the memory storing computer-readable instructions that, when executed by the at least one processor, further cause the container image importer to:
- when a plurality of operators require a same container image, import the same container image only once.

13. A method for importing a plurality of container images from at least one upstream repository, the method comprising:
- maintaining a first list of current container images for a current version of a software product;
- determining a second list of newer container images for a subsequent version of the software product with respect to the current version;
- when a newer container image is missing from the second list, adding the newer container image to a third list of newer container images;
- repeating the adding of all newer container images missing from the second list to the third list; and
- importing, via a communication interface, container images from the at least one upstream repository only for the newer container images on the third list, wherein the newer container images are imported only once spanning all versions of the software product.

14. The method of claim 13, further comprising:
- when the current version of the software product is an initial version of the software product, importing all of the container images in the first list of the first list of current container images.

15. The method of claim 13, further comprising:
- obtaining a first manifest file, wherein a first set of container images and a second set of container images are partitioned into an active category and an archived category, respectively;
- including the first set of container images into the third list, wherein the first set of container images is imported from the at least one upstream repository; and
- obtaining the second set of container images from a local repository.

16. The method of claim 15, further comprising:
- receiving a catalog index image and a list of requested container images; and
- adding only a subset of newer container images in an active category of the first manifest file, wherein the subset of newer container images is indicated by both the catalog index image and the list of requested images.

17. The method of claim 16, wherein the subset comprises a first container image, the method further comprising:
- modifying a second manifest file when the second manifest file includes the first container image under the active category.

18. One or more non-transitory computer-readable media storing instructions that, when executed by a computing platform comprising at least one processor, and memory, cause the computing platform to:
- maintain a first list of current container images for a current version of a software product;
- determine a second list of newer container images for a subsequent version of the software product with respect to the current version;
- when a newer container image is missing from the second list, add the newer container image to a third list of newer container images;
- repeat the adding of all newer container images missing from the second list to the third list; and
- import container images from at least one upstream repository only for the newer container images on the third list.

* * * * *